United States Patent [19]
Litin et al.

[11] Patent Number: 5,480,191
[45] Date of Patent: Jan. 2, 1996

[54] SPILL CONTAINING STORAGE AND TRANSPORTATION DEVICE

[75] Inventors: Michael H. Litin, Jamesville, Wis.; John O. Milliken, Gates Mills; James P. Onders, Independence, both of Ohio

[73] Assignee: ENPAC Corporation, Chardon, Ohio

[21] Appl. No.: 303,675

[22] Filed: Sep. 9, 1994

Related U.S. Application Data

[63] Continuation-in-part of Ser. No. 201,019, Feb. 24, 1994.

[51] Int. Cl.⁶ .................................................. B62B 1/26
[52] U.S. Cl. ................. 280/831; 280/47.26; 280/79.5; 141/88; 220/571; 248/129
[58] Field of Search .............................. 220/571, 573, 220/DIG. 24, 4.04, 4.05, 4.06, 4.12, 4.13, 426; 141/86, 88; 184/106; 248/129; 108/24; 137/234.6, 312; D9/517; D34/25, 20, 19, 39; 222/608; 280/831–836, 838, 839, DIG. 2, 47.26, 47.17, 47.23, 79.2, 79.5, 79.11

[56] References Cited

U.S. PATENT DOCUMENTS

| | | | |
|---|---|---|---|
| 285,967 | 10/1883 | Capman | 248/129 |
| 861,848 | 7/1907 | Herreid | 248/129 |
| 948,994 | 2/1910 | Howland | 220/571 |
| 1,029,045 | 6/1912 | Boyum | 280/47.23 |
| 1,063,724 | 6/1913 | Patterson | 220/571 |
| 1,487,065 | 3/1924 | Irons | 220/571 |
| 1,584,175 | 5/1926 | Irons | 220/571 |
| 3,353,615 | 11/1967 | Nekimken | 220/571 |
| 3,920,144 | 11/1975 | Callen | 220/571 |
| 4,106,648 | 8/1978 | Dickson | 280/47.24 |
| 4,877,261 | 10/1989 | Heisson | 280/47.26 |
| 5,118,004 | 6/1992 | Carilli | 220/571 |
| 5,174,467 | 12/1992 | Sullivan | 220/571 |
| 5,285,989 | 2/1994 | Zilbert et al. | 248/146 |
| 5,292,140 | 3/1994 | Laing | 280/79.5 |

*Primary Examiner*—Ann Marie Boehler
*Attorney, Agent, or Firm*—Pearne, Gordon, McCoy & Granger

[57] ABSTRACT

A molded plastic drum storage and/or transportation device has an inner wall conforming to a drum to be carried or stored. An outer wall is spaced from the inner wall to create a containment space therebetween. One end of the cart has a recess for collecting spills or overflow from the drum. Apertures in the recess allow fluid to flow into the containment space where it is held until emptied through a drain hole. According to one aspect of this invention, the device is tiltable and has wheels to facilitate transport of the drum. According to another aspect of the invention, the device is stationary and is adapted to store multiple drums in spaced horizontal adjacency and, with a drum spacer, in spaced vertical adjacency.

21 Claims, 9 Drawing Sheets

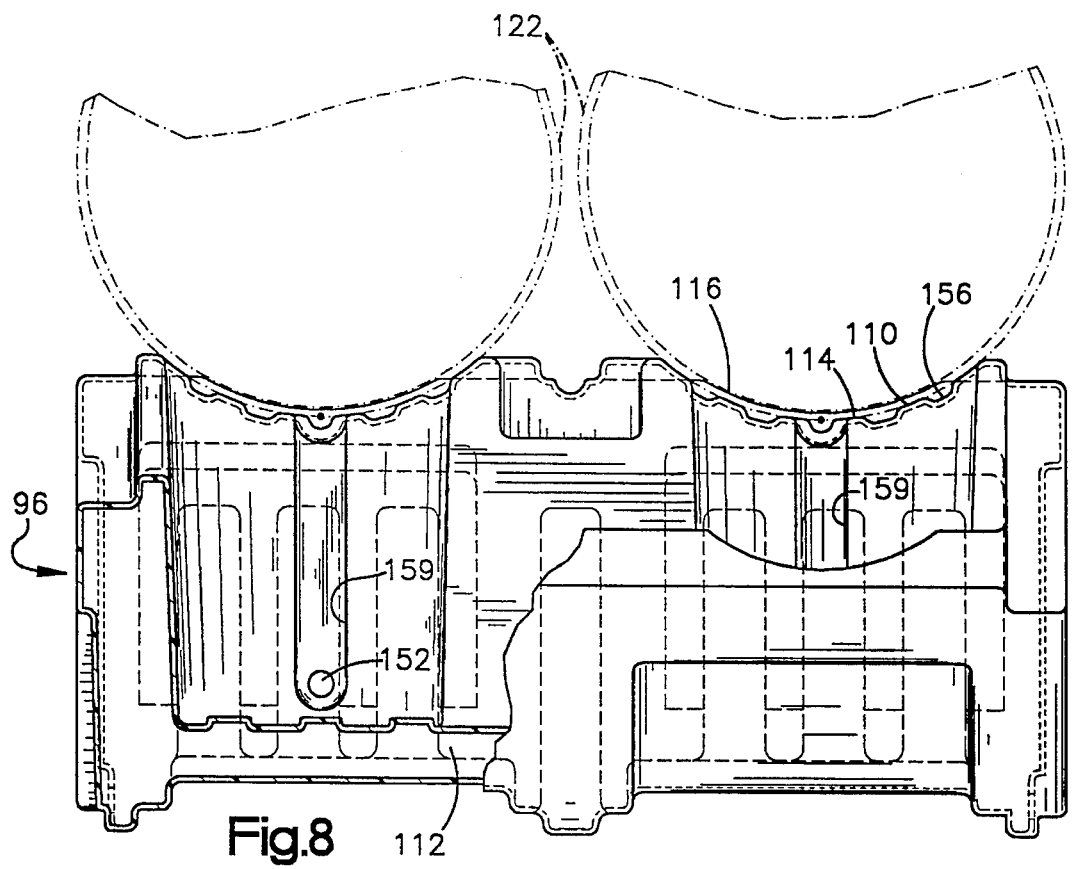
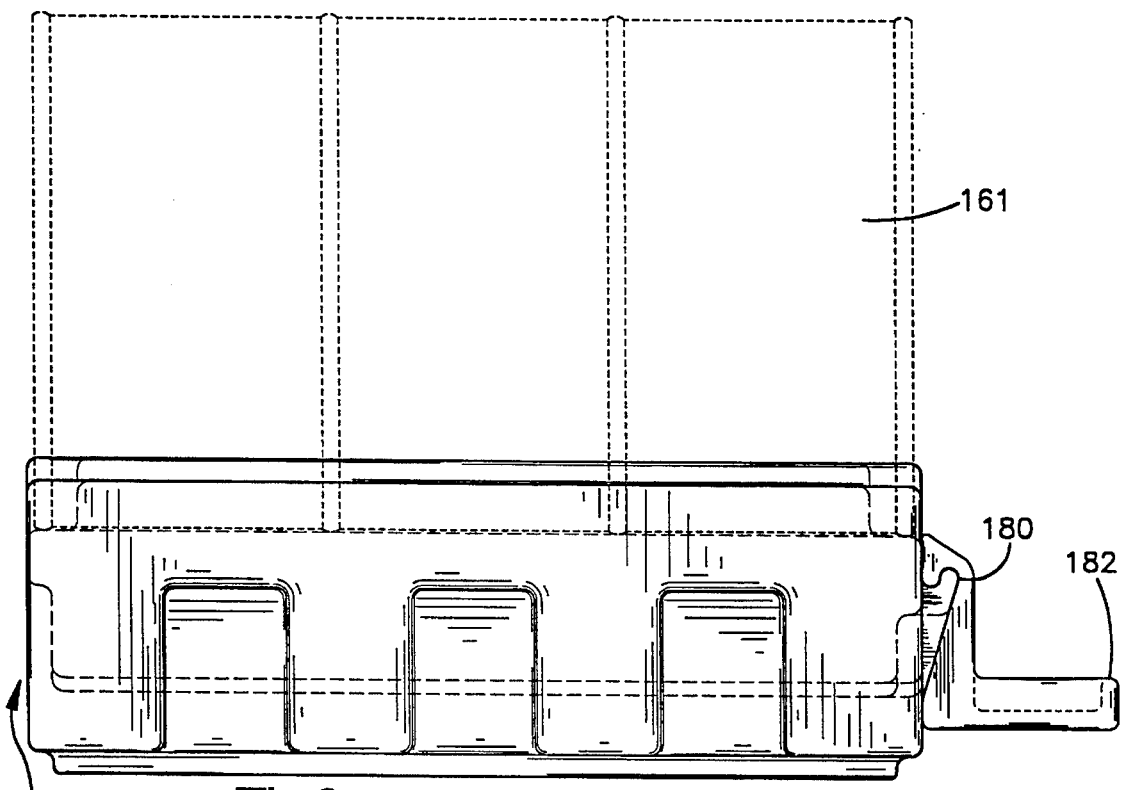

5,480,191

SPILL CONTAINING STORAGE AND TRANSPORTATION DEVICE

This is a Continuation-In-Part of co-pending application Ser. No. 08/201,019, filed Feb. 24, 1994.

BACKGROUND OF THE INVENTION

1. Field of the Invention

This invention relates generally to the field of drum storage and handling and specifically to a drum storage unit having a spill containment feature.

2. Description of the Related Art

Metal drums or barrels are usually stored in a horizontal position on racks which mount the drums at least two abreast and four high. These racks are typically constructed from structural steel with welded frames. Spill and leak containment of horizontally stored drums is provided by placing a rack which mounts two horizontally positioned drums on the surface pallet of a container basin and placing five-gallon pails on the pallet adjacent the drum tap. Such a container basin and pallet arrangement is disclosed in co-pending application Ser. No. 08/201,019, filed Feb. 24, 1994.

The basin and pallet assembly is intended to store the drums in a vertical position, and mounting a horizontal storage rack on the basin pallet is not recommended because of the inherent instability of the assembly. Positioning a basin under commercially available storage racks is impossible because of the lack of clearance.

While the storage of drums in a vertical position on containment basins permits greater security against leakage and spills, the drums may be accessed only by immersion pumps. Gravity discharge is attainable with the drum stored in a horizontal position, but spill and leakage containment is a problem.

It is also necessary to transport and store individual drums to and at remote stations with the drum being stored in a horizontal position for convenient gravity discharge. This is conventionally done by a drum dolly which is adapted to transport and then rock the drum to a stationary horizontal position. A catch basin may be positioned under the drum for spillage. One such cart is shown in U.S. Pat. No. 4,106,648 to Dickson.

SUMMARY OF THE INVENTION

The present invention provides a drum rack which provides for horizontal storage of a drum and for containment of spillage or leakage. The rack is a unitary molded article having a pair of side-by-side drum storage portions. Each storage portion has an inner wall defining a receptacle for the storage of a drum in a horizontal position. The inner wall is joined with and spaced from an outer wall to define a containment space therebetween. An aperture in the inner wall defines a passage into the containment space.

The inner wall defines a cylindrical support surface conforming to the drum. A recess in the inner wall at an end of the support surface is defined by a bottom wall and vertical walls and has an aperture in a lower portion communicating between the recess and the containment space. A drain hole through the outer wall is plugged with a removable drain plug.

The vertical wall of the recess which intersects with the drum support surface has a cylindrical surface which defines a recess for a drip pail positioned in the recess directly below the overhanging outlet or tap for the drum.

A spacer rack having upper and lower cylindrical surfaces conforming to the curvature of the drums may be placed over the drums to support an additional pair of drums.

According to another aspect of the present invention provides a drum cart constructed of a body having an inner wall defining a receptacle for a drum. The inner wall is joined with and is spaced from an outer wall to define a containment space therebetween. Wheels are disposed on the body to permit movement of the cart. An aperture in the inner wall defines a passage into the containment space.

The inner wall defines a support surface conforming to the drum. A recess in the inner wall at an end of the support surface is defined by a bottom wall and vertical walls and has an aperture in its bottom wall communicating between the recess and the containment space. Wheels are disposed on the cart so as to support the outer wall above the floor surface at a certain angle of the cart for facilitating movement thereof. A drain hole through the outer wall is plugged with a removable drain plug.

The vertical wall of the recess which intersects with the drum support surface has a cylindrical surface which defines a recess for a drip pail positioned in the recess directly below the overhanging outlet or tap for the drum.

According to the invention, the drum is easily loaded onto and supported by the cart in an upright position. The drum is transported by tilting and rolling the cart. Spilled or excess fluid is captured in the recess and flows into the containment space.

To load the cart, a lower edge of the cart is pushed against the bottom edge of a drum. The lower edge of the cart has a generally U-shaped contour so that substantially flat upper edges of the parallel legs of the U-shaped contour engage the ends of an arc straddled by the U-shaped contour. The cart is tilted until an upper edge of the drum is engaged by the bottom support. With the cart in this position, the drum is strapped to the cart. The cart is then rocked toward the drum to tilt the drum slightly, and the lower portion of the cart is kicked at a lower toe-recess to insert the flat upper edges of the legs under the edge of the drum. After the edges of the legs are under the edge of the drum and, with a foot in the toe-recess, the cart is rocked rearwardly. The rearward rocking of the cart and drum causes the bottom edge of the drum to ride along ramps in the end of the cart until it is securely nested in the drum support.

This invention also provides a cart or dolly which may be easily unloaded. With the drum strapped to the cart, the cart is tilted to an upright position and then further tilted forwardly until the overhanging edge of the drum engages the ground. The drum is then unstrapped, and the cart is pivoted about the drum using an upper portion of the drum as a fulcrum. The drum bottom is thus caused to slide down the ramps in the end of the cart, and continued pivoting of the cart relative to the drum removes the flat upper edges of the legs from beneath the drum.

The cart is easy to use and permits the drum to be filled, emptied or used on the cart. The cart provides spill containment for safety and cleanliness. Fluids in the containment space are easily transported and properly disposed.

BRIEF DESCRIPTION OF THE DRAWINGS

FIG. 8 shows a partially cross-sectional view, the plane of the section being indicated by the line 8—8 in FIG. 7;

FIG. 9 is a side elevational view of a drum stacker which may be used in combination with the rack;

DESCRIPTION OF THE PREFERRED EMBODIMENTS

Figure 1:
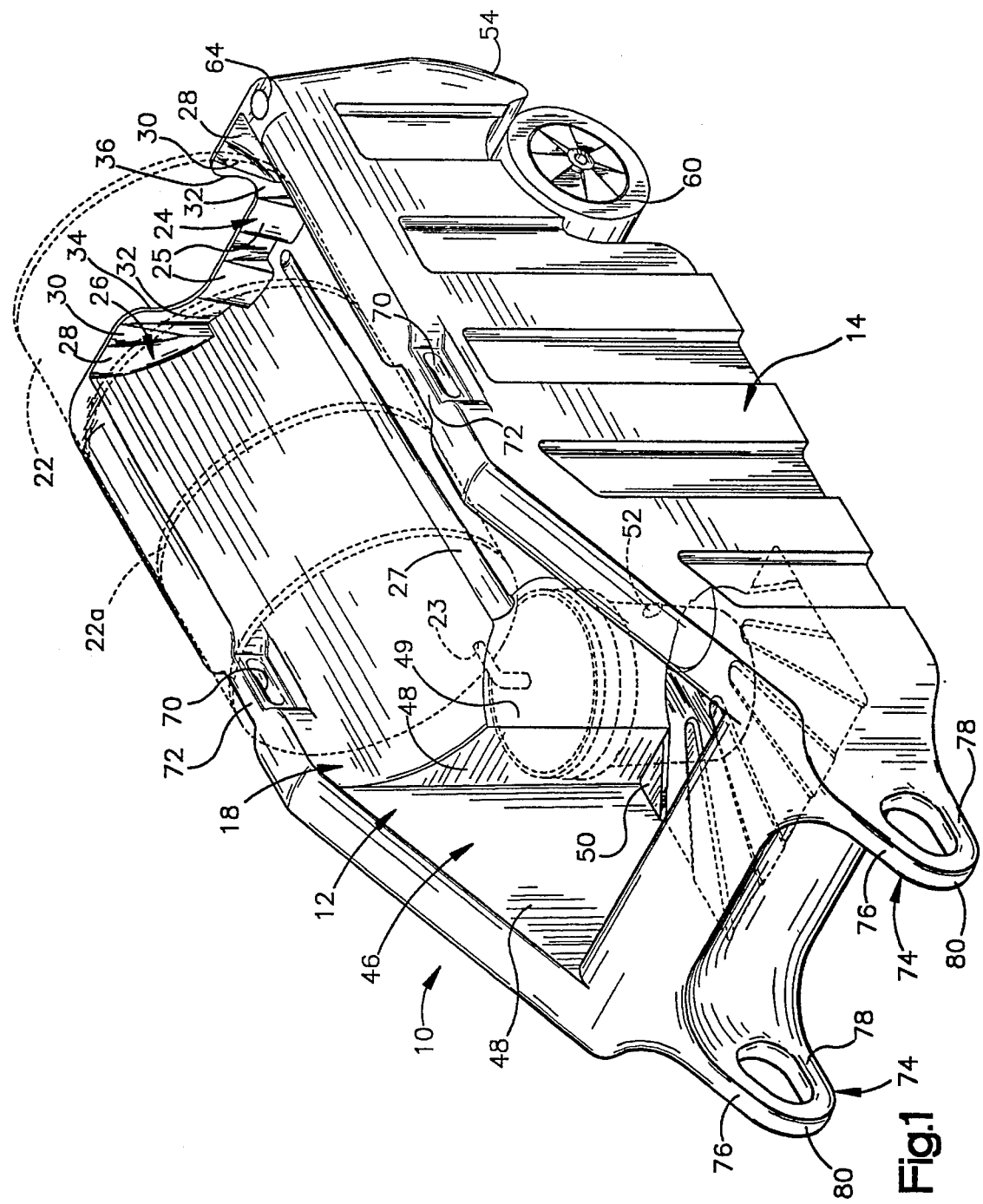
FIG. 1 shows a perspective view of a drum cart according to one aspect of the invention.
Figure 2:
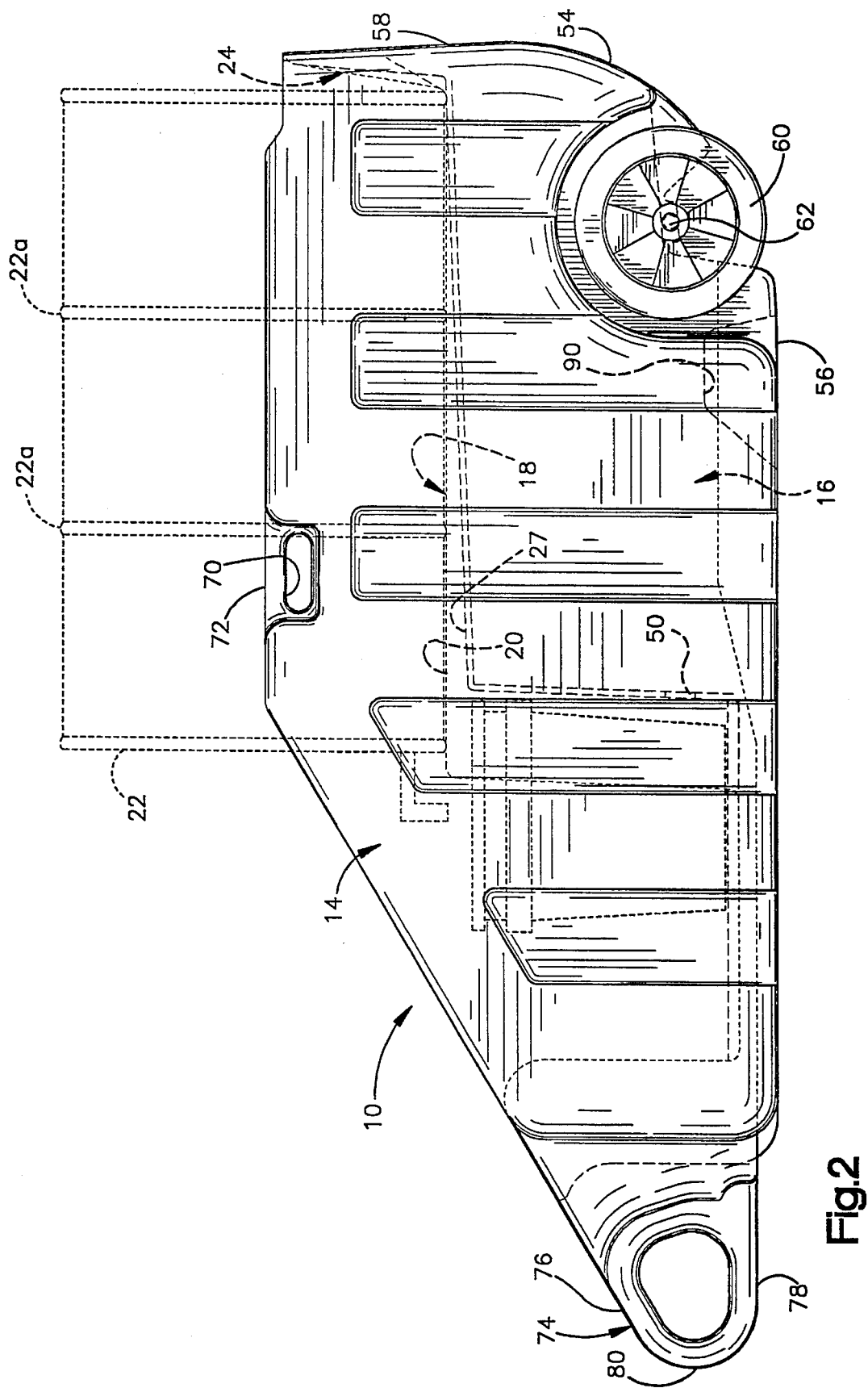
FIG. 2 shows a side elevational view of the cart.
Figure 3:
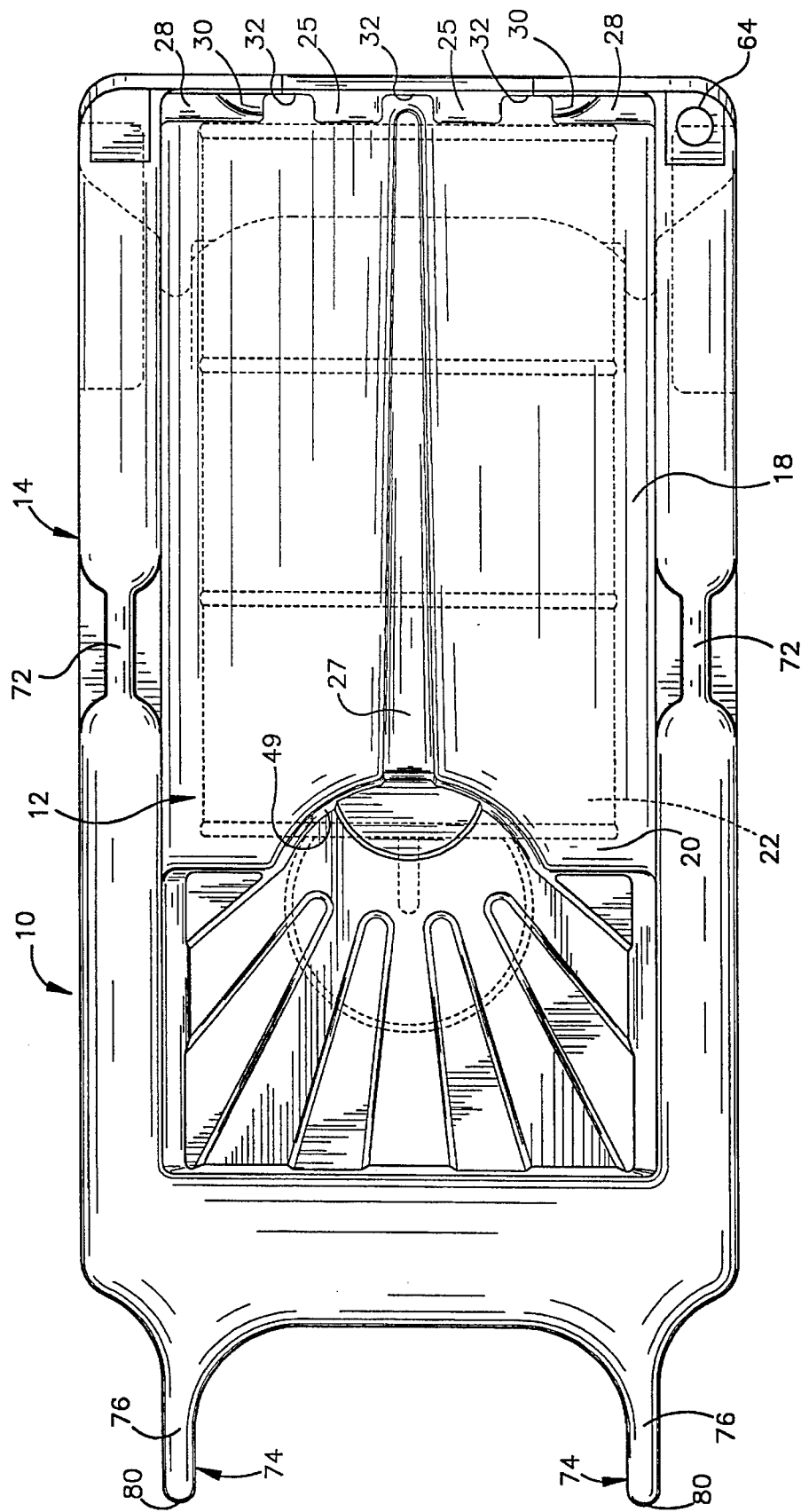
FIG. 3 shows a top view of the cart.
Figure 4:
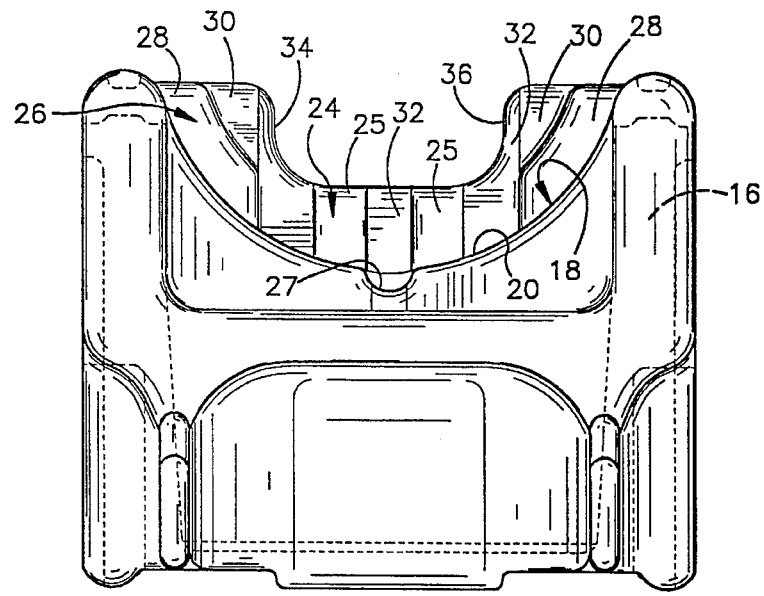
FIG. 4 shows a front end view of the cart.
Figure 6:
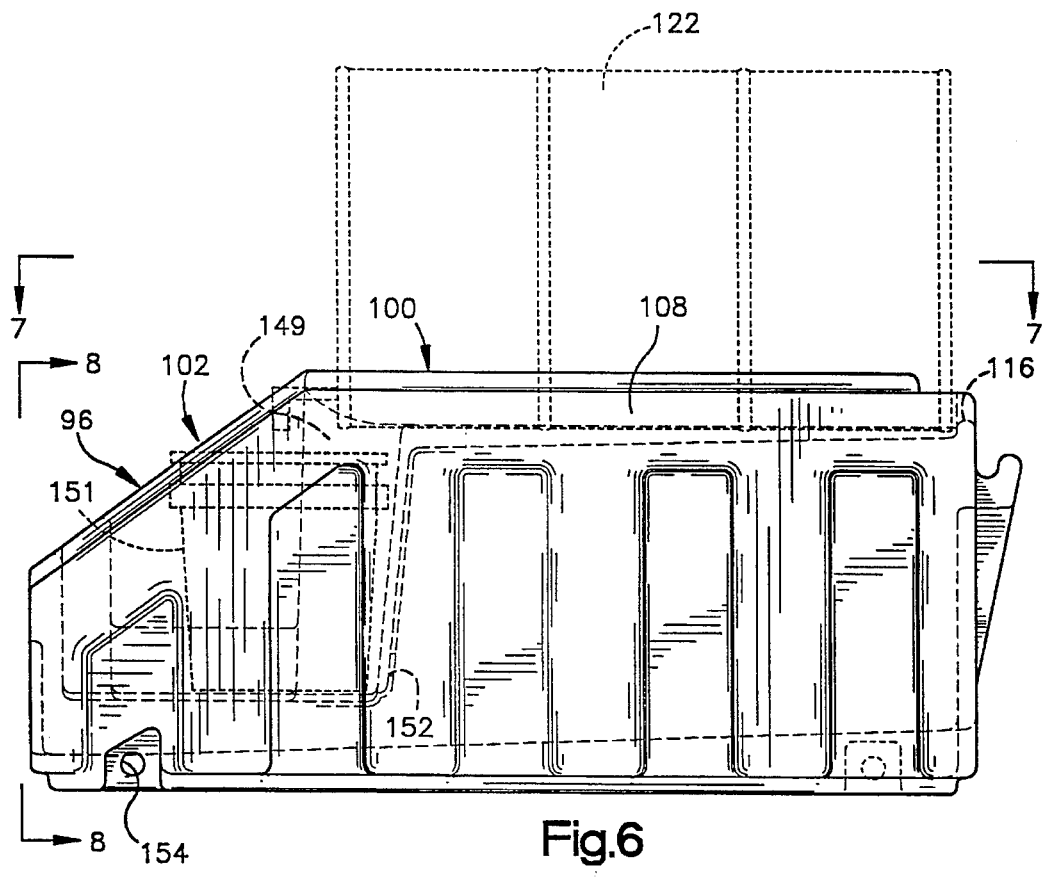
FIG. 6 shows a side elevational view of the rack.
Figure 5:
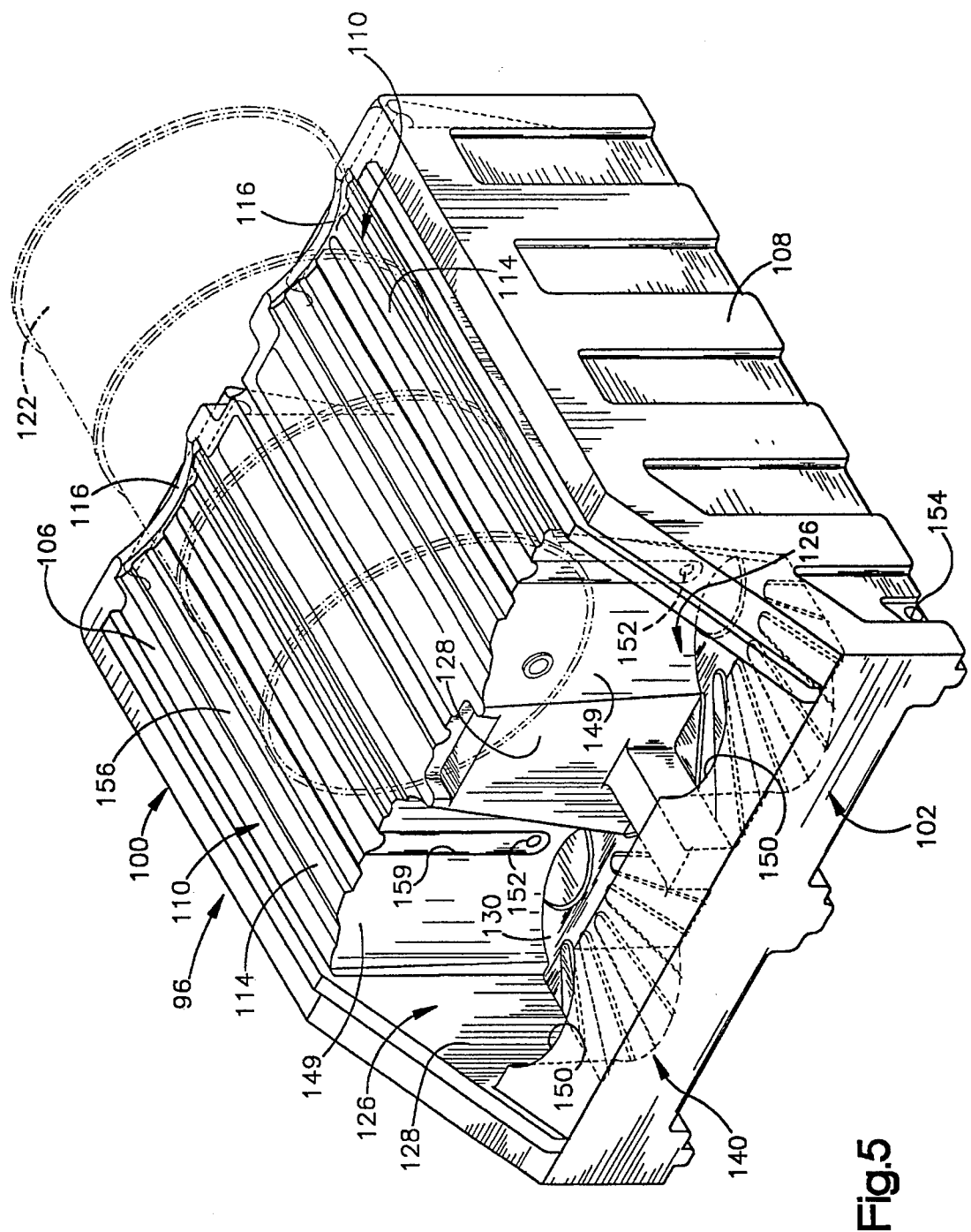
FIG. 5 shows a perspective view of a drum storage rack according to a further aspect of this invention.
Figure 7:
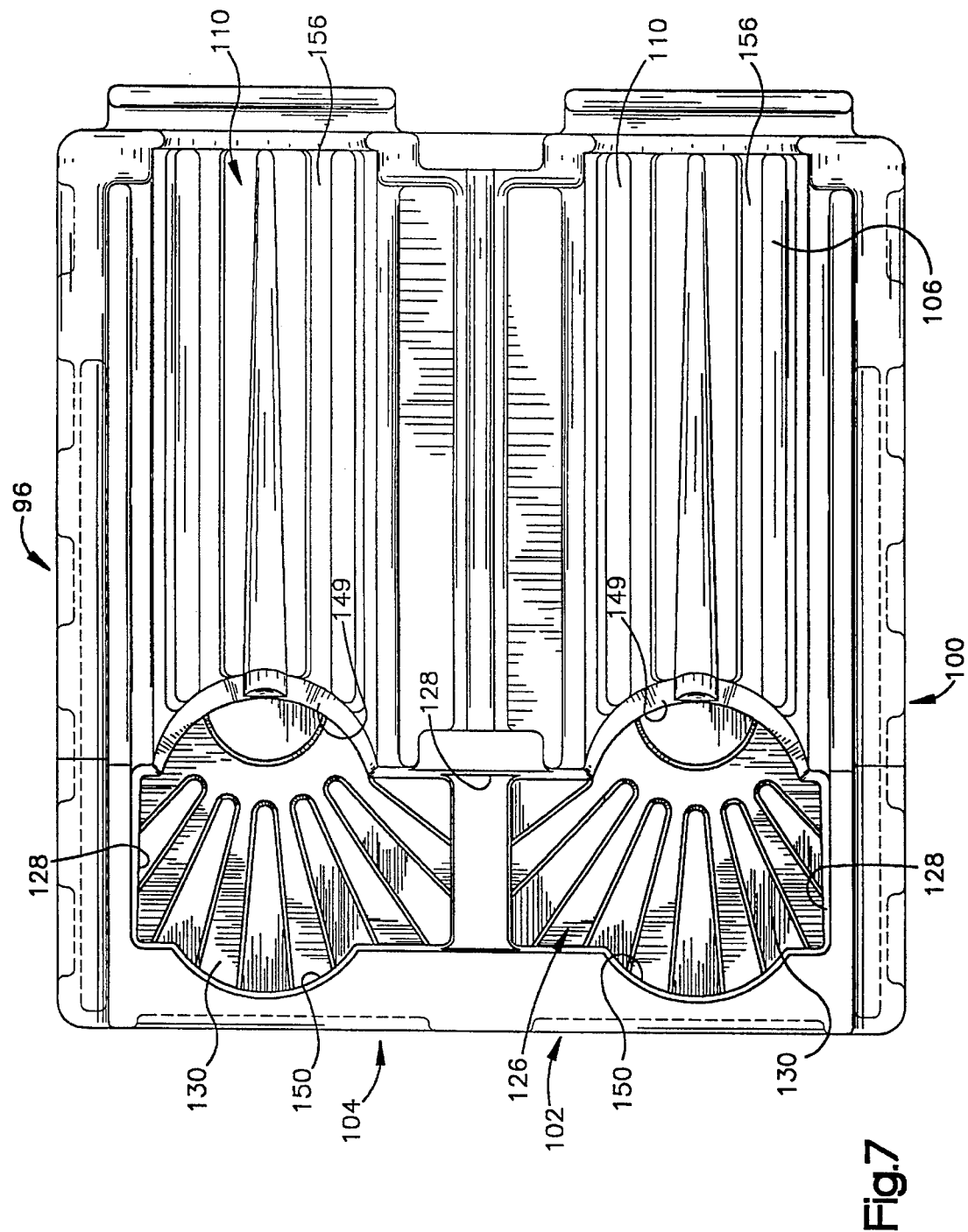
FIG. 7 shows a top view of the rack.

Referring to FIGS. 1 through 4, a drum cart has a body 10 formed of an inner wall 12 and an outer wall 14. The body is preferably made in a one piece construction of high density polyethylene or other suitable rigid, inert material. The inner and outer walls 12 and 14 are spaced apart so as to form a containment space 16 therebetween, as shown in FIG. 2.

The inner wall 12 is inwardly curved to define a receptacle or cradle 18. The receptacle 18 is defined by a partially cylindrical bottom support surface 20 for receiving and supporting a side of a cylindrical drum 22 and a rear support surface 24 at an end of the bottom support 20 for supporting an end of the drum 22. The drum 22 has an access opening 23 for filling and emptying the drum. The bottom support surface 20 is sloped downwardly a few degrees from the rear support surface 24 and has a longitudinal trough 27 which permits drainage which might otherwise be blocked by circumferential ribs 22a on the drum 22. The rear support 24 has a plurality of ribs having inclined faces 25.

The-rear support 24 is further defined by a pair of ribs 26 having inclined faces 28. At the inner edge of each face 28, there is provided a ramp 30. The rear support 24 has a flat base area 32 and is provided with a cut-out portion which is defined by a U-shaped contour having substantially flat parallel legs 34 and 36.

At the end of the receptacle 18 opposite the rear support 24, a recess 46 is formed by the inner wall 12. The recess preferably has four side walls 48 and a bottom wall 50. An aperture 52 defines a passage from the recess 46 into the containment space 16. Preferably, the area of the aperture 52 is greater than the area of the access opening 23 to prevent overflow from spilling out of the recess 46. Also, the containment space 16 should have a volumetric capacity at least equal to that of the drum 22.

The outer wall 14 preferably has a curved surface 54 joining bottom and rear surfaces 56 and 58, as shown in FIG. 2. Either the bottom or rear surfaces 56 or 58 can rest on a floor or other surface to support the cart. The curved surface 54 facilitates tilting of the cart between a horizontal position (shown) and a vertical position.

A pair of wheels or rollers 60 are mounted to the body 10 on an axle 62 near the curved surface 54. A drain hole 64 plugged by a removable drain plug (not shown) is located in the outer wall 14 at a convenient location for draining liquid from the containment space 16, either by gravity with the cart in a vertical position, or by a pump inserted in the hole 64. The hole 64 also serves as a vent opening if left unplugged while the cart is in a horizontal position.

Lateral apertures 70 are provided at the upper edges of the cart to provide strapping support rails 72 for a drum retaining strap (not shown).

A pair of hand-holds 74 are provided at one end of the cart for transporting the cart and for tilting the cart to load and unload a drum. It may be noted that each hand-hold 74 has first and second essentially straight portions 76 and 78 which converge toward an arcuate end portion 80. Each portion 76 may be grasped comfortably by the operator for lifting the cart, and each portion 78 may be grasped comfortably by the operator for pushing the cart to a position discharging the drum, with the arcuate portion 80 providing a smooth transitional portion between these positions.

To load the cart, the cart is rotated to a vertical position, and the cut-out portion of the flat base area 32 is pushed against the drum so that its U-shaped contour straddles the bottom edge of the drum 22. The cart is then tilted toward the drum 22 until an upper edge of the drum is engaged by the bottom support 20. With the cart in this position, the drum 22 is strapped to the cart. The cart is then rocked toward the drum 22 slightly, and the lower portion of the cart is kicked at a lower toe-recess 90 (FIG. 1) to insert the edges of the substantially flat parallel legs 34 and 36 under the drum. After the legs 34 and 36 are under the edge of the drum and, with a foot in the toe-recess 90, the cart is then rocked rearwardly. Arcuately spaced portions of the bottom edge of the drum initially engage the ramps 30 and slide up these ramps to the inclined faces 28 of the ribs 26 while a centrally located area of the bottom edge of the drum is guided by the inclined faces 25. It may be noted that the slope of the faces 25 is greater than that of the faces 28 so that, upon discharge of the drum from the cart, the drum easily slides down the faces 28.

This aspect of the present invention provides a lightweight and easily movable cart for holding and transporting a drum. The cart shown could be adapted to hold two or more drums or could be adapted to transport differently configured or sized containers. The cart should be configured to conform generally to the containers to be carried. Containment of spills and overflows is easily and safely accomplished to facilitate proper disposal thereof.

Referring now to FIGS. 5 through 9, a drum storage rack 96 and an associated spacer 98 are illustrated. The drum storage rack 96 is comprised of a unitary, rotationally cast body 100 having a pair of side-by-side drum storage portions 102 and 104. Each storage portion 102 and 104 has an inner wall 106 and an outer wall 108. The body 100 is preferably rotationally cast in a one-piece construction of high density polyethylene or other suitable rigid, inert material. The inner and outer walls 106 and 108 are spaced apart so as to form a containment space 112 therebetween.

The inner wall 106 is inwardly curved to define a receptacle or cradle 110. The cradle 110 is defined by a partially cylindrical bottom support surface 114 for receiving and supporting a side of the cylindrical drum 122 and a rear spillage rim or dam 116.

At the end of the cradle 110, opposite the dam 116, a recess 126 is formed by the inner wall 106. The recess 126 preferably has four side walls 128 and a bottom wall 130.

The vertical wall 128 of the recess 126 which intersects with the drum support surface 110 has a cylindrical surface 149 which defines a recess for a drip pail 151 positioned in the recess directly below the overhanging outlet or tap from the drum. The opposite vertical wall is also provided with a recess 150 which permits a pail to be removed from the recess 149 without spillage as the pail clears the overhanging drum. A drain outlet 152 is provided in the wall 149 at a level which is slightly above the bottom wall 130 so that minor spillage from the pail or drum may be mopped up without flowing out of the drain opening 152 and needlessly accumulating in the containment space 112. The opening 152 provides communication with the containment space 112 so that major spillage from the drum may be contained. A drain opening 154 is provided and is normally closed by a threaded plug (not shown). Vent openings (not shown) may be provided at an upper portion of the rack so that air is not trapped in the containment space 112 above the opening 152. It may be noted that the surface 114 is provided with corrugations 156 which serve to strengthen the surface 114 and which permit liquids to drain into the recess and not be blocked by corrugations on the drum. Also, vertical recesses 159 are provided in the recesses 149 so that the drain openings 152 are not blocked by a pail 151.

Figure 10:
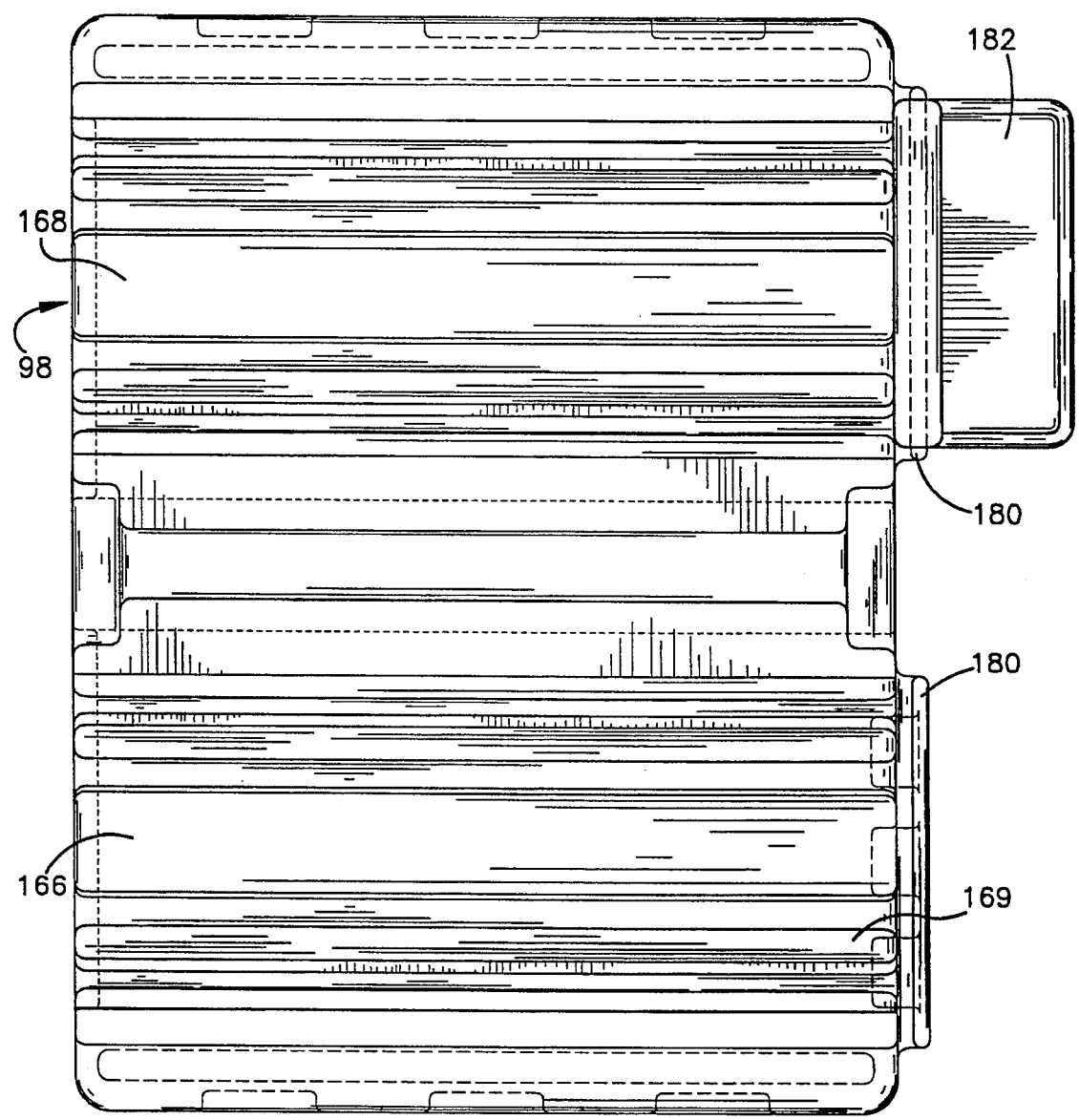
FIG. 10 is a top view of the drum stacker shown in FIG. 9; and 9
Figure 11:
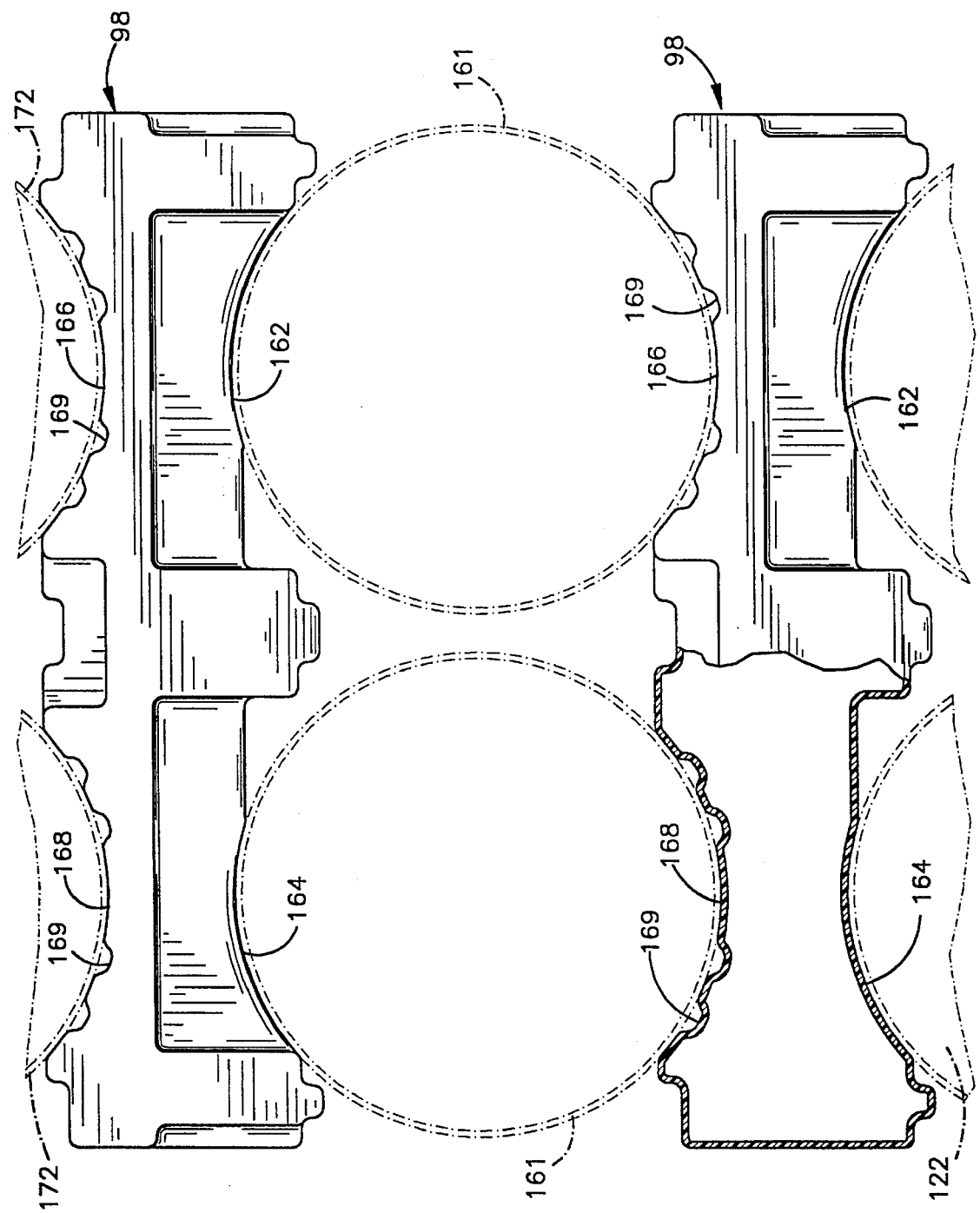
FIG. 11 is a rear view, partly in section, of a pair of drum stackers, illustrating the use of such stackers for multiple level storage.

Referring now to FIGS. 9, 10 and 11, there is illustrated the drum spacer 98 which may be mounted on the drums 122 to permit additional drums 161 to be stored on the drums 122. The spacer 98 may be rotationally cast and is provided with a pair of spaced, cylindrical bottom surfaces 162 and 164 (FIG. 11) which conform to the curvature of the drums 122. A pair of spaced, cylindrically-shaped upper surfaces 166 and 168 are provided to support additional drums 172. The surfaces 166 and 168 are provided with longitudinally-extending grooves 169 to minimize the collection of fluids on the surfaces 166 and 168.

A molded-in hook 180 is provided at the front edge of each surface 166 and 168 to detachably receive a shelf 182. The shelf 182 is adapted to support and position a pail beneath an access opening of each drum 161 and 172. It should be noted that any spillage from the pail will be received by a recess 126.

The present disclosure describes several embodiments of the invention, however, the invention is not limited to these embodiments. Other variations are contemplated to be within the spirit and scope of the invention and appended claims.

What is claimed is:

1. A drum support and containment assembly comprising spaced inner and outer walls defining a substantially closed containment space, said inner wall defining a raised drum support surface and defining a receptacle at one end of said support surface, said receptacle being defined by vertical walls with at least a portion of a vertical wall which extends from said support surface to a bottom portion of said receptacle being concave and defining an arcuate intersection with said bottom portion of said receptacle so that a drum mounted on said support surface may overhang said bottom portion and so that a pail positioned adjacent said concave portion may be positioned beneath an overhanging portion of the drum, and an aperture in said receptacle defining a passage into said containment space.

2. A drum support and containment assembly according to claim 1, wherein said drum support surface is cylindrical.

3. A drum support and containment assembly according to claim 2, wherein said drum support surface has a longitudinally extending drain trough formed therein which slopes downwardly from a distal end of said support surface to a proximal end adjacent said receptacle.

4. A drum support and containment assembly according to claim 1, wherein said aperture is in one of said vertical walls and spaced slightly above said bottom portion.

5. A drum support and containment assembly according to claim 4, wherein said aperture is in said concave portion of said vertical wall.

6. A drum support and containment assembly according to claim 1, wherein said inner wall defines a plurality of adjacent and parallel raised drum support surfaces and defines a plurality of adjacent and parallel receptacles.

7. A drum support and containment assembly according to claim 1, including ground-engaging wheels at one end of said assembly and handles at the other end thereof permitting movement of the assembly as a dolly.

8. A drum support and containment assembly according to claim 7, wherein said drum support surface is cylindrical.

9. A drum support and containment assembly according to claim 8, wherein said drum support surface has a longitudinally extending drain trough formed therein which slopes downwardly from a distal end of said support surface to a proximal end adjacent said receptacle.

10. A drum support and containment assembly according to claim 7, wherein said aperture is in one of said vertical walls and spaced slightly above said bottom portion.

11. A drum support and containment assembly according to claim 10, wherein said aperture is in said concave portion of said vertical wall.

12. A drum support and containment assembly comprising spaced inner and outer walls defining a substantially closed containment space, said inner wall defining a pair of adjacent and parallel drum support surfaces and defining a pair of adjacent and a pair of parallel receptacles at one end of each said support surfaces, each said receptacle being defined by vertical walls with at least a portion of a vertical wall which extends from each said support surface to a bottom portion of each said receptacle being a concave portion, a cylindrical drum mounted on each support surface, each said drum overhanging the bottom portion of a receptacle so that a pail may be positioned adjacent said concave portion and beneath an overhanging portion of a drum, and an aperture in each receptacle defining a passage into said containment space.

13. A drum support and containment assembly according to claim 12, including a support rack mounted on adjacent pairs of drums, said support rack having a bottom surface defining a pair of concave cylindrical mounting surfaces conforming to the shape of said drums, and said rack having upper support surfaces conforming to the shape of a pair of additional drums mounted on said upper support surfaces.

14. A drum support and containment assembly according to claim 12, wherein said drum support surfaces are cylindrical.

15. A drum support and containment assembly according to claim 14, wherein said drum support surfaces each have a longitudinally extending drain trough formed therein which slopes downwardly from a distal end of each support surface to a proximal end adjacent a said receptacle.

16. A drum support and containment assembly according to claim 12, wherein each said aperture is in one of said vertical walls and spaced slightly above said bottom portion.

17. A drum support and containment assembly according to claim 16, wherein each said aperture is in said concave portion of said vertical wall.

18. A drum support and containment assembly comprising spaced inner and outer walls defining a substantially closed containment space, said inner walls defining a raised drum support surface and defining a receptacle at one end of said support surface, said receptacle being defined by vertical walls with at least a portion of a vertical wall which extends from said support surface to a bottom portion of said receptacle being a concave portion so that a drum mounted on said support surface may overhang said bottom portion and so that a pail positioned adjacent said concave portion may be positioned beneath an overhanging portion of the drum, an aperture in said receptacle defining a passage into said containment space, ground-engaging wheels at one end of said assembly and handles at the other end thereof permitting movement of the-assembly as a dolly, said one end of said assembly being defined by a wall having a planar outer face which has a U-shaped edge contour defined by flat parallel legs, said legs being adapted to be inserted under the lower edge of a vertically standing drum with the assembly in a vertical position, sloping guide surfaces extending from said legs to an intersection between an inner portion of said wall and said drum support surface, whereby a drum may be positioned on said support surface by inserting said legs under the lower edge of said drum, tilting said assembly to permit said edge to slide along said guide surfaces to said intersection and to permit said drum to be received on said support surface.

19. A drum support and containment assembly according to claim 18, wherein said drum support surface has a longitudinally extending drain trough formed therein which slopes downwardly from a distal end of said support surface to a proximal end adjacent said receptacle.

20. A drum support and containment assembly according to claim 18, wherein said aperture is in one of said vertical walls and spaced slightly above said bottom portion.

21. A drum support and containment assembly according to claim 20, wherein said aperture is in said concave portion of said vertical wall.

* * * * *

UNITED STATES PATENT AND TRADEMARK OFFICE
CERTIFICATE OF CORRECTION

PATENT NO. : 5,480,191
DATED : January 2, 1996
INVENTOR(S) : Michael H. Litin et al.

It is certified that error appears in the above-indentified patent and that said Letters Patent is hereby corrected as shown below:

Column 3, line 12, please delete "and 9";

Column 3, line 12, move sentence starting with "FIG. 11... "to start on line 13;

Column 3, line 38, please delete "The-rear" and insert --The rear--; and

Column 7, line 5, (Claim 18, line 15), please delete "the-assembly" and insert--the assembly--.

Signed and Sealed this

Fourteenth Day of May, 1996

Attest:

BRUCE LEHMAN

*Attesting Officer*   Commissioner of Patents and Trademarks